US011704346B2

(12) United States Patent
Okoshi et al.

(10) Patent No.: US 11,704,346 B2
(45) Date of Patent: Jul. 18, 2023

(54) SYSTEM OF HIGHLY DETAILING MAP DATA, SERVER FOR THE SAME, AND METHOD OF HIGHLY DETAILING MAP DATA

(71) Applicant: HITACHI, LTD., Tokyo (JP)

(72) Inventors: Kyoko Okoshi, Tokyo (JP); Takashi Nomura, Tokyo (JP); Kunihiro Kato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/278,729

(22) PCT Filed: Sep. 6, 2019

(86) PCT No.: PCT/JP2019/035285
§ 371 (c)(1),
(2) Date: Mar. 23, 2021

(87) PCT Pub. No.: WO2020/066560
PCT Pub. Date: Apr. 2, 2020

(65) Prior Publication Data
US 2022/0035843 A1    Feb. 3, 2022

(30) Foreign Application Priority Data
Sep. 27, 2018 (JP) .................................. 2018-182978

(51) Int. Cl.
*G06F 16/00* (2019.01)
*G06F 16/29* (2019.01)
(Continued)

(52) U.S. Cl.
CPC .......... *G06F 16/29* (2019.01); *G06F 16/2365* (2019.01); *G06F 16/258* (2019.01)

(58) Field of Classification Search
CPC .......... G06F 30/20; G06F 16/29; G06F 30/15; G06F 11/36; G06F 11/3616;
(Continued)

(56) References Cited

U.S. PATENT DOCUMENTS 9,612,123 B1*   4/2017  Levinson ............... G01C 21/32
2007/0299606 A1*  12/2007  Fujimoto .................. B60T 7/22
701/450

(Continued)

FOREIGN PATENT DOCUMENTS

CN      105937912 A    9/2016
JP      2018-081252 A  5/2018

OTHER PUBLICATIONS

International Search Report, PCT/JP2019/035285, dated Nov. 19, 2019, 2 pgs.
(Continued)

*Primary Examiner* — Dinku W Gebresenbet
(74) *Attorney, Agent, or Firm* — Volpe Koenig

(57) ABSTRACT

A system of highly detailed mapping data for correcting the data format and detail level of the map data adaptively to a specification of a distribution destination. The system includes a data supplementing unit for supplementing medium-/low-detail map data to make the map data highly detailed, an authoring unit for editing the map data adapted to the multiple specifications which differ at least in one of the data format and the detail level, and a database for accumulating the edited map data to allow distribution of the map data as versatile data. The system includes a reliability evaluation unit communicating with the distribution destination via information, and allowing evaluation of reliability indicating a degree to which the versatile data are adapted to the specification, and a reliability registration unit for registering the reliability in the database by associating the
(Continued)

evaluation of the reliability evaluation unit with the versatile data.

5 Claims, 10 Drawing Sheets

(51) Int. Cl.
  *G06F 16/25* (2019.01)
  *G06F 16/23* (2019.01)
(58) Field of Classification Search
  CPC ...... G06F 16/2246; G06F 17/18; G06F 3/011; G06F 3/0482; G06F 3/04842; G06F 3/04847; G06F 8/65; G06F 16/2365; G06F 16/258; G01C 21/3819; G01C 21/3896; G08G 1/0129; G08G 1/0141; G08G 1/096725; G08G 1/096741; G08G 1/096775; G08G 1/0112
  See application file for complete search history.

(56) References Cited

U.S. PATENT DOCUMENTS

| | | |
|---|---|---|
| 2015/0177013 A1 | 6/2015 | Siliski et al. |
| 2016/0259814 A1* | 9/2016 | Mizoguchi .............. G06F 16/29 |
| 2018/0188037 A1 | 7/2018 | Wheeler et al. |
| 2018/0245929 A1* | 8/2018 | Watanabe .......... G01C 21/3848 |
| 2019/0265050 A1 | 8/2019 | Fujimoto |
| 2019/0279247 A1* | 9/2019 | Finken ................. H04L 9/0637 |

OTHER PUBLICATIONS

Chinese Office Action dated Mar. 11, 2022 for Chinese Patent Application No. 201980043527.3.
Extended European Search Report dated Apr. 26, 2022 for European Patent Application No. 19864563.2.

* cited by examiner

FIG.6

| DATA IDENTIFICATION ID | SUPPLEMENTARY RATE N | RELIABILITY | BASIC DATA GENERATION DATE | RELIABILITY EVALUATION DATE | RELIABILITY CHANGE INFORMATION |
|---|---|---|---|---|---|
| 1 | 0 | A | 20180813 | 20180920 | 0A0A |
| 2 | 30 | B | 20180813 | 20180920 | 0C0B |
| 3 | 60 | C | 20170910 | 20180920 | 0C0C |

FIG.8

| DATA IDENTIFICATION ID | RELIABILITY EVALUATION | RELIABILITY EVALUATION DATE | RELIABILITY CHANGE INFORMATION |
|---|---|---|---|
| 1 | A | 20180920 | 0A0A |
| 2 | B | 20180920 | 0C0B |
| 3 | C | 20180920 | 0C0C |

SYSTEM OF HIGHLY DETAILING MAP DATA, SERVER FOR THE SAME, AND METHOD OF HIGHLY DETAILING MAP DATA

TECHNICAL FIELD

The present invention relates to a system of highly detailing map data, a server for the system, and a method of highly detailing map data, and specifically, relates to the system of highly detailing map data, which is demanded to provide map data with higher detail level and higher accuracy compared with those for generally employed car navigation systems, the server for the system, and the method of highly detailing map data.

BACKGROUND ART

Recently, automatic driving technology using map data has been increasingly commercialized. The automatic driving technology has been utilizing the map data in addition to the sensor information for correcting vehicle positions, and prefetching road information on the traveling route. The map data for the foregoing purpose is required to exhibit higher detail level and higher accuracy compared with those for the generally employed car navigation system. Accordingly, basic map data used as the basic material for generating the high-detail map data for automatic driving operations have been made highly detailed and highly accurate through surveying techniques and special systems.

In order to maintain the basic map data highly detailed and highly accurate, change in the road information, for example, the newly constructed road has to be taken into the basic map data on the regular basis. Therefore, re-survey at the cycle as short as possible is indispensable to the approach using the current survey technique. In the foregoing circumstances, at present, the map data for automatic driving operations have been highly priced, serving as one of obstacles to spread of the automatic driving technology. One of solutions for lowering the map data cost has been known (for example, see Patent Literature 1) as technology of omitting the re-survey using the special system by taking the information from each onboard machine of the respective general vehicles to correct the map data.

CITATION LIST

Patent Literature

Patent Literature 1: Japanese Patent Laid-Open No. 2018-81252

SUMMARY OF INVENTION

Technical Problem

The technique as disclosed in the patent literature 1 is designed to allow the onboard machine to receive navigation signals sent from positioning satellites for detecting position coordinates of the vehicle. Then an error between each position coordinate of the actual map elements and the position coordinate of the map element stored in the map data for automatic driving operation is acquired so as to correct each position coordinate of the map elements of the map data in cooperation with the center system. The resultant map data may be supplied at low costs. The technique as disclosed in the patent literature 1 may be implemented on the assumption of correcting the originally high-priced map data for automatic driving operations. In other words, the problem of the high-priced map data for automatic driving operations has not been solved yet.

Currently, implementation of the automatic driving technology is still a major issue for individual automobile manufacturers competing with one another. Requirements of the map data for automatic driving operations will be determined depending on the balance with each of sensors employed by the respective automobile manufacturers, causing difference in specifications of the respective manufacturers. The required detail level of the map data for automatic driving operations does not have to be the highest over the whole range. Depending on the automatic driving system constructed by each of the automobile manufacturers, the map elements needed for data for automatic driving operations, and reliability required for such data become different, and have not been standardized. This is one of factors that fail to reduce the cost of the map data for automatic driving operations.

The present invention has been made to solve the foregoing problem, and it is an object of the present invention to provide a system of highly detailing map data, configured to execute the process of editing the low-detail or medium-detail map data which are procurable at low prices for upgrading to the high-detail map data, and to enhance versatility of data to easily make the reliability and the data format adaptable to the usage for reducing procuring costs of the high-detail map data.

Solution to Problem

In order to achieve the object, the invention according to the present invention provides a system of highly detailing map data for correcting a data format and a detail level of the map data adaptively to a required specification of a distribution destination. The system includes a data supplementing unit for supplementing medium-/low-detail map data to make the map data highly detailed, an authoring unit for editing the map data adaptively to the multiple required specifications of the distribution destination, which differ at least in one of the data format and the detail level, and a database for accumulating the map data edited by the authoring unit to allow distribution of the map data as versatile data.

Although the foregoing system of highly detailing map data employs the low-priced low-/medium-detail map data instead of the high-priced map data for automatic driving operations, the map data may be upgraded to the high-detail map data by data supplementation. The resultant high-detail map data have been edited by the authoring unit for enhancing versatility, and easily made adaptable to the reliability and the data format specified for different specifications of the individual distribution destinations. As a result, the procuring cost of the high-detail map data may be reduced.

The system of highly detailing map data according to the present invention further includes a reliability evaluation unit for performing information communication with the distribution destination, and allowing evaluation of reliability indicating a degree to which the versatile data distributed from the database are adapted to the required specification, and a reliability registration unit for registering the reliability in the database by associating the evaluation of the reliability evaluation unit with the versatile data individually.

The system allows the reliability evaluation unit to evaluate reliability of the versatile data distributed to the distribution destination with respect to the required specification of the distribution destination. The evaluation of the reliability evaluation unit is registered in the database in association with the versatile data individually. From the versatile data which have been registered in association with the reliability, the data adapted to the reliability specified and required by the distribution destination are selected and output. In this case, the distribution destination (onboard machine side) is allowed to receive the data before selection, and to select the data to be used. Versatility of the versatile data accumulated in the database may be retained to improve the registered reliability every time when those data are used by the different distribution destination.

In the system of highly detailing map data according to the present invention, the distribution destination is an onboard machine of an automatic drive vehicle. The system further includes a reliability determination unit between the reliability evaluation unit and the reliability registration unit to determine the reliability as an index indicating whether or not the versatile data are adapted to the automatic drive vehicle based on a result of comparison between a supplementary rate calculated as a degree of a need for the data supplementation and a threshold value. If the reliability determination unit determines that the reliability is highly accurate, the reliability registration unit updates a registered content of the reliability in association with the versatile data.

The reliability determination unit determines whether or not the versatile data is adapted to the multiple required specification specified by each onboard machine for individual automatic drive vehicles, which differ at least in one of data format and detail level. If the reliability determination unit determines that the reliability is highly accurate, the reliability registration unit updates the registered content of the reliability associated with the versatile data. This facilitates selective distribution of the high-detail map data with high reliability, which is adaptable to each request which differs depending on the automatic drive vehicle.

Advantageous Effects of Invention

The present invention provides the system of highly detailing map data, which allows reduction in the procuring cost of the high-detail map data.

BRIEF DESCRIPTION OF DRAWINGS

FIG. 6 represents an example of a reliability information table in each unit indicating the respective segments of the map data.

FIG. 8 represents an example of a reliability evaluation information table.

DESCRIPTION OF EMBODIMENT

Technology Based on which the Invention is Made

An MMS (Mobile Mapping System) is a vehicle mounted measuring device configured to use a three-dimensional laser measuring device and a digital camera to acquire three-dimensional coordinate data and continuous video images of roads and peripheral area. The MMS aims at efficient and sophisticated road maintenance operations, and supports optimization of life cycle costs and life extension of social infrastructures, thus contributing to support for constructing the dynamic map (high-detail map data) required for automatic driving operations.

Based on the road video images and three-dimensional point group data of the road peripheral environment, which have been acquired by the MMS, more accurate position information may be acquired. Especially, road displays and road attachments which are hardly located in detail under normal management operations may be used as the road database to be of help to construct the comprehensive system for maintaining the road infrastructure. The road display and the road attachment represent lighting systems, sound insulation walls, guardrails, manholes, telegraph poles, billboards, planting zones, road signs, and road information control facilities.

Embodiment

Figure 1:
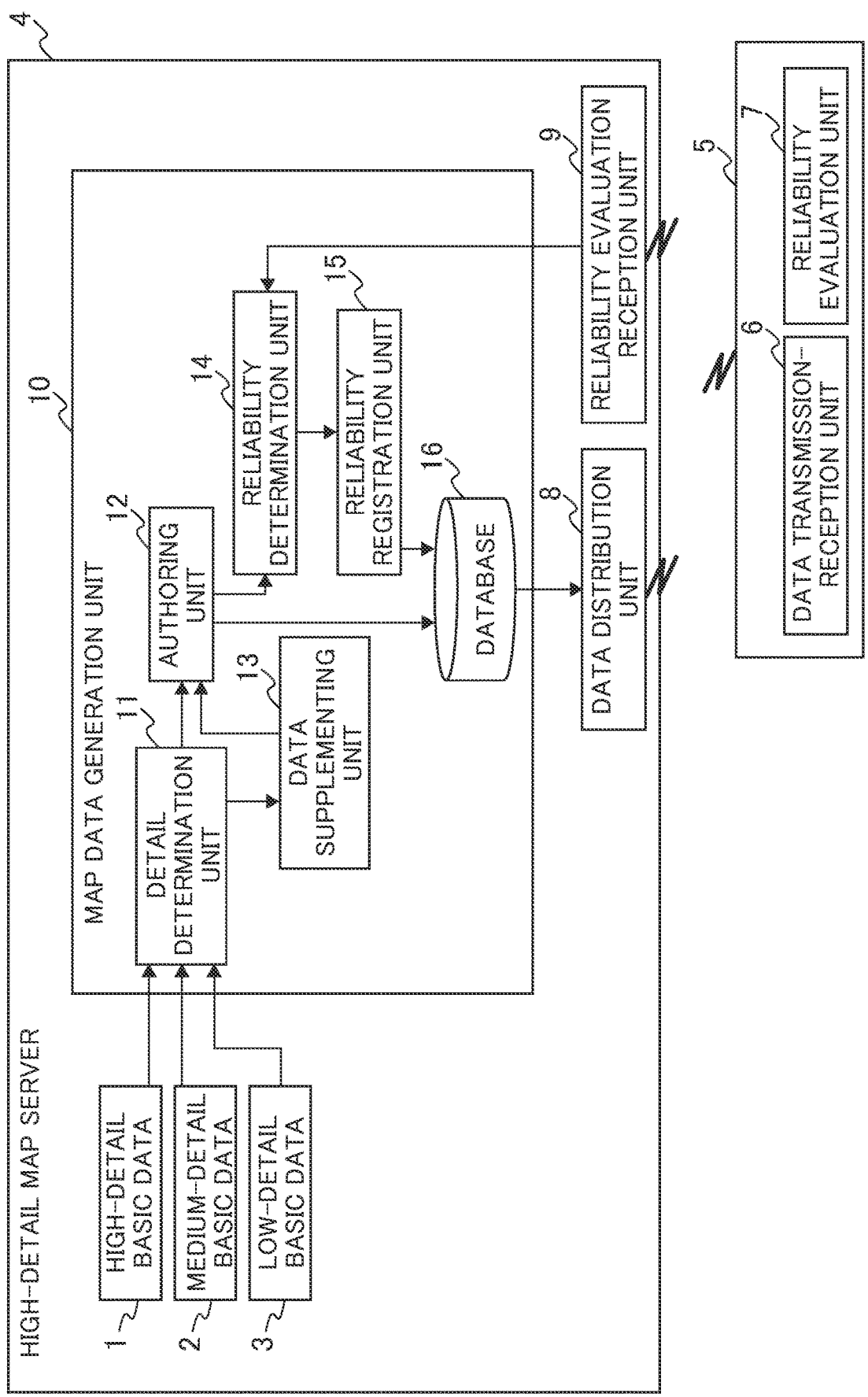
FIG. 1 is a block diagram illustrating an overall structure of a system of highly detailing map data (hereinafter referred to as "present system") according to an embodiment of the present invention.

A system of highly detailing map data (present system), a high-detail map data server (present server), and a method of highly detailing map data (present method) according to an embodiment of the present invention will be briefly described with reference to FIGS. 1 to 10. FIG. 1 is a block diagram illustrating an overall structure of the present system. A present server 4 enclosed in a large-sized frame of FIG. 1 constitutes a core part of the present system that can be upgraded to the degree so that various types of map data each with different quality become available for automatic driving operations. A data distribution unit 8 will distribute the high-detail map data to an onboard machine 5 provided with a data transmission/reception unit 6.

A map data generation unit 10 in the present server 4 generates map data available for automatic driving operations by suitably executing a highly detailing process to basic data with different detail levels which have been input, including high-detail basic data 1, medium-detail basic data 2, and low-detail basic data 3. The highly detailing process may be applied to the automatic drive vehicle for gradual advancement.

Upon practical implementation, the present system works to bring the highly detailing process in progress. Depending on the stage of the highly detailing process, the implemented system according to the embodiment may fail to guarantee security of the automatic driving operations which rely only on the map data. In the foregoing stage, it is preferable to apply the automatic drive operation using the sensor which needs not completely relay on the map data while supplementing the insufficient medium-/low-level map data.

In light of the foregoing description, "currently, implementation of the automatic driving technology is still a major issue for individual automobile manufacturers competing with one another. Requirements of the map data for automatic driving operations will be determined depending on the balance with each of sensors employed by the respective automobile manufacturers, causing difference in specifications of the respective manufacturers". In other words, the requirement of the map data may be determined in consideration of the balance with the information to be relied on without requiring highly detailing of all sections of the map data for automatic driving operations.

The present server 4 may be a commercial computer such as a personal computer. Although structures of the server are not illustrated in detail in the drawing, the server includes an arithmetic processor (CPU), a storage unit, a program which is stored in the storage unit, and is executable by the CPU, various functions each implemented through execution of the program by the CPU, an input/output unit which is connected to the respective functions via information for communication with the user, and a communication unit for communicating information with the outside. Each of those structures includes various function blocks to be described referring to designated codes as shown in FIG. 1.

The data generation unit 10 enclosed in a medium-sized frame of FIG. 1 includes the respective functions to be implemented through execution of the program by the CPU, and a database 16 stored in the storage unit.

The map data generation unit 10 includes a detail determination unit 11 which determines the detail level of the basic data taken into the map data generation unit 10, an authoring unit 12 which organizes data elements available for automatic driving operations, and generates data in accordance with a suitable format, a data supplementing unit 13 which supplements insufficient detail level of the basic data, a reliability determination unit 14 which determines data reliability in a unit indicating each segment of the generated data, a reliability registration unit 15 which registers the determined reliability in the segment unit, and the database 16 which stores the generated data.

The reliability to be registered represents assurance that such reliability allows the map data to be available in response to the request for automatic driving operations. The detail level of the map data required for automatic driving operations do not have to be the highest over the entire range of the data. The present server 4 is capable of providing the map data adaptively to different required specifications, that is, high versatility. The highest accuracy represents accuracy of the position information or the like based on the road video images and the three-dimensional point group data of the peripheral road environments, which have been acquired by the MMS.

The segment described herein is defined as a management unit of the map data, specifically, the unit that allows effective management of reliability. For example, as will be described referring to FIGS. 3, 5, 6, 8, the unit stands for a description segment for management of the information with respect to the limited intersection having its reliability evaluated. The map data of the present system will be upgraded comprehensively while undergoing stages for sequentially updating in each description segment.

The reliability is evaluated by the reliability evaluation unit 7 of the onboard machine 5, transmitted from the data transmission/reception unit 6, and received by the reliability evaluation reception unit 9 of the present server 4. The reliability determination unit 14 takes the received reliability as a reliability evaluation index.

Figure 2:
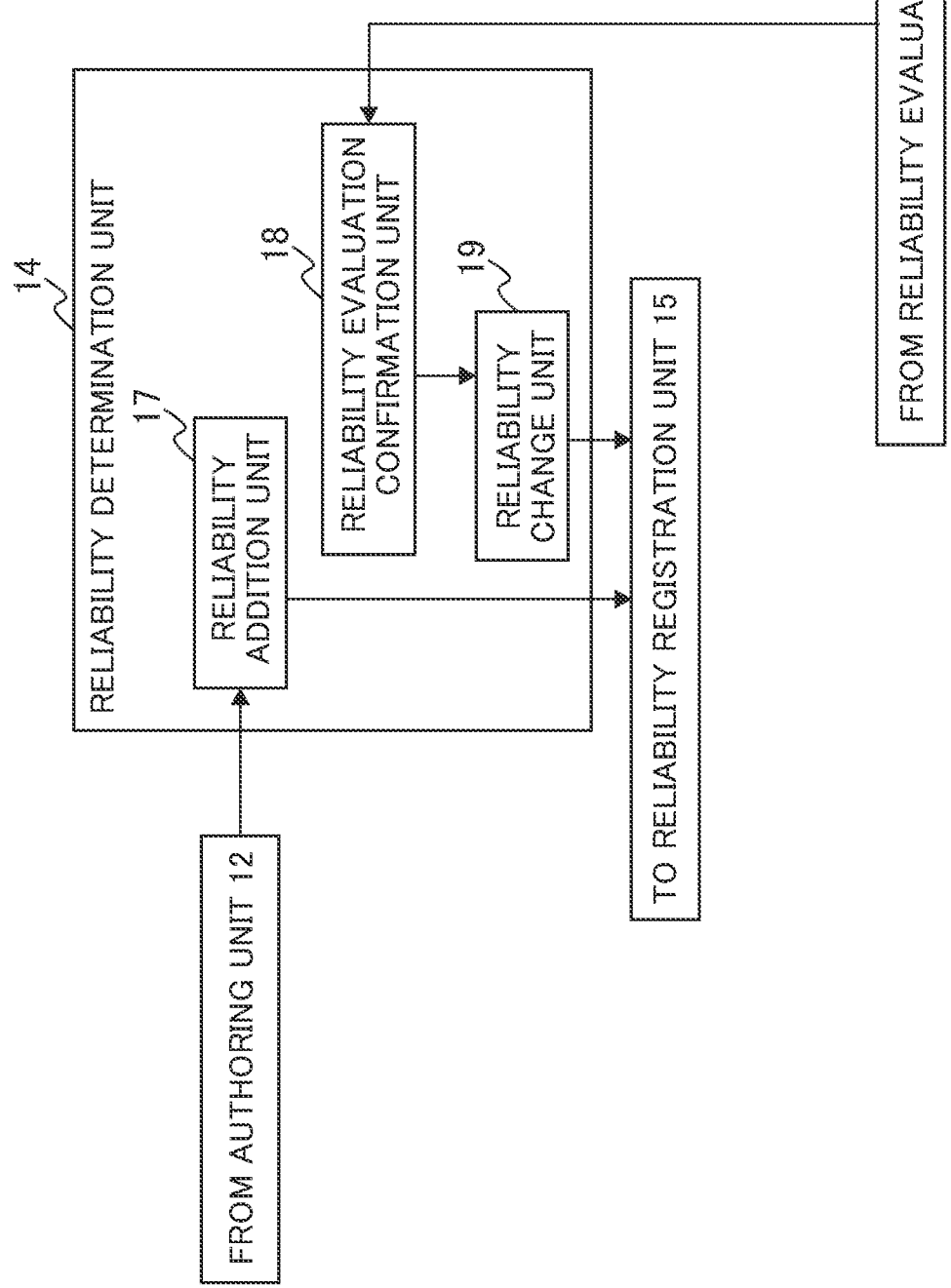
FIG. 2 is a block diagram illustrating a reliability determination unit of the present system as shown in FIG. 1 in more detail.

FIG. 2 is a block diagram illustrating the reliability determination unit of the present system as shown in FIG. 1 in more detail. As FIG. 2 illustrates, the reliability determination unit 14 includes a reliability addition unit 17 which adds reliability of the map data to each of the segment units in accordance with the detail level of the basic data, a reliability evaluation confirmation unit 18 which confirms whether or not it is necessary to update the reliability in each of the respective segment units in response to the reliability evaluation from the onboard machine, and a reliability change unit 19 which changes the reliability in each segment unit responding to the need for updating the reliability in each of the respective segment units.

Figure 3:
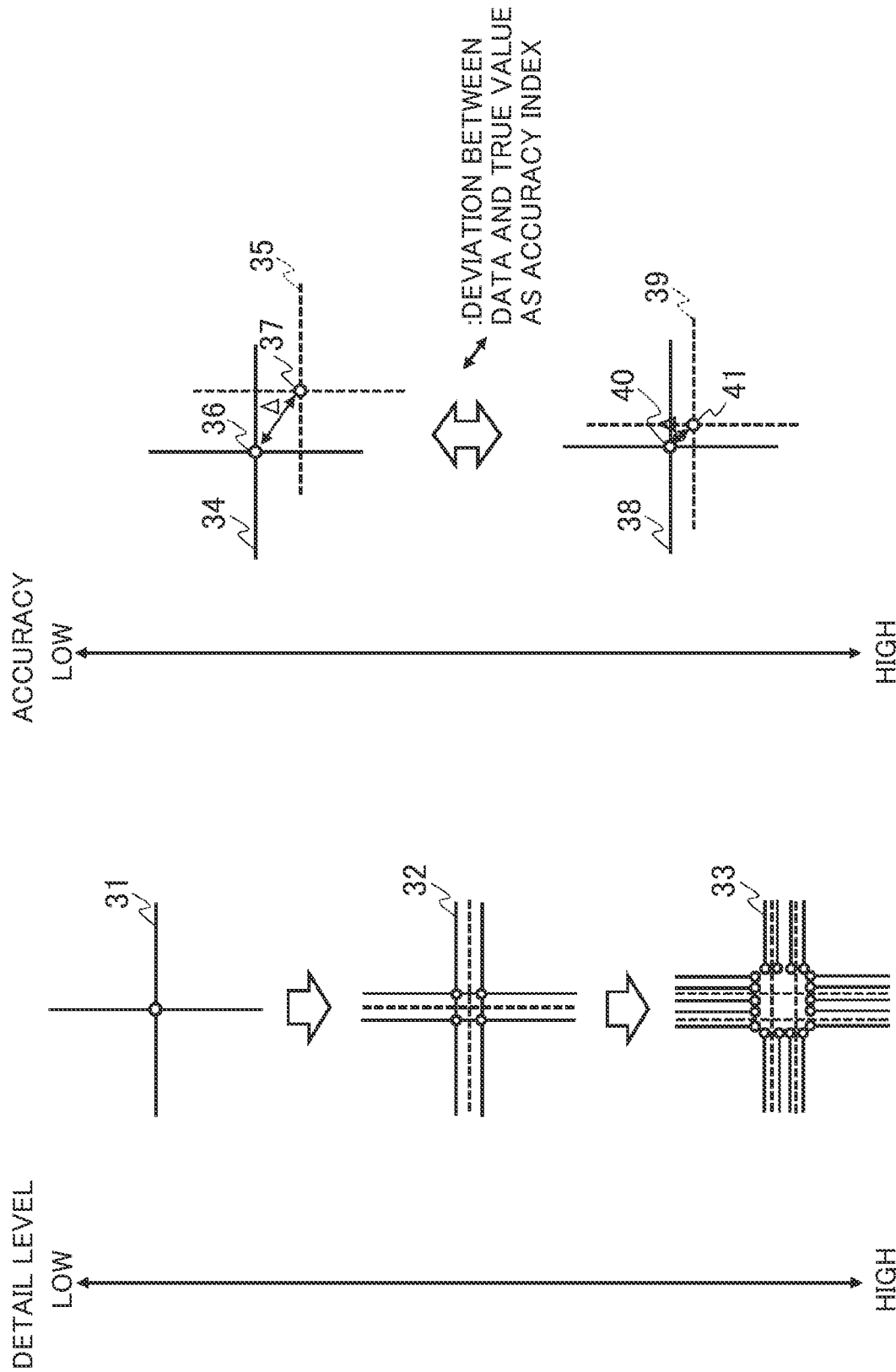
FIG. 3 is an explanatory view of the detail level and accuracy of the map data.

FIG. 3 is an explanatory view of the detail level and accuracy of the map data. The detail level of the map data stands for the degree to which the data are expressed in detail. An exemplified case will be described referring to the drawing illustrating a high-standard road with relatively wide width, which includes existing 4 lanes constituted by 2 up-lanes and 2 down-lanes. The left section of FIG. 3 illustrates three examples of road data expressed in low-detail, medium-detail, and high-detail levels, respectively.

If the single road is expressed only with a single road centerline 31, the detail level is low. If the single road is expressed with two centerlines 32 including an up-lane and a down-lane, the detail level is medium. If the single road is expressed with four lane centerlines 33 in accordance with the number of lanes, the detail level is high. The centerlines 32 of up and down lanes will be expressed as a single line for each of the up and down lanes in spite of multiple lanes. The lane centerlines 33 in the drawing indicate the respective centerlines of at least four lanes in total.

Like the "detail level" as descripted above, the "accuracy" represents the concept for evaluating quality of the map. The accuracy of the map data stands for the degree of concordance between the data and actual conditions. The right section of FIG. 3 illustrates a road center data_data value 34 for explaining low accuracy, and a true value 35 for explaining low accuracy. Referring to intersections expressed with a road center data_data value intersection position 36 for explaining low accuracy and a true value_intersection position 37 for explaining low accuracy, a deviation between those intersection positions is illustrated with a triangle mark.

Meanwhile, the drawing illustrates a road center data_data value 38 for explaining high accuracy, and a true value 39 for explaining high accuracy. Referring to the respective intersection positions expressed with a road center data_data value intersection position 40 for explaining high accuracy, and a true value_intersection position 41 for explaining high accuracy, a deviation between those intersection positions is illustrated with a triangle mark as indicated by FIG. 3. The deviation is smaller than the former one, indicating high accuracy.

Figure 4:
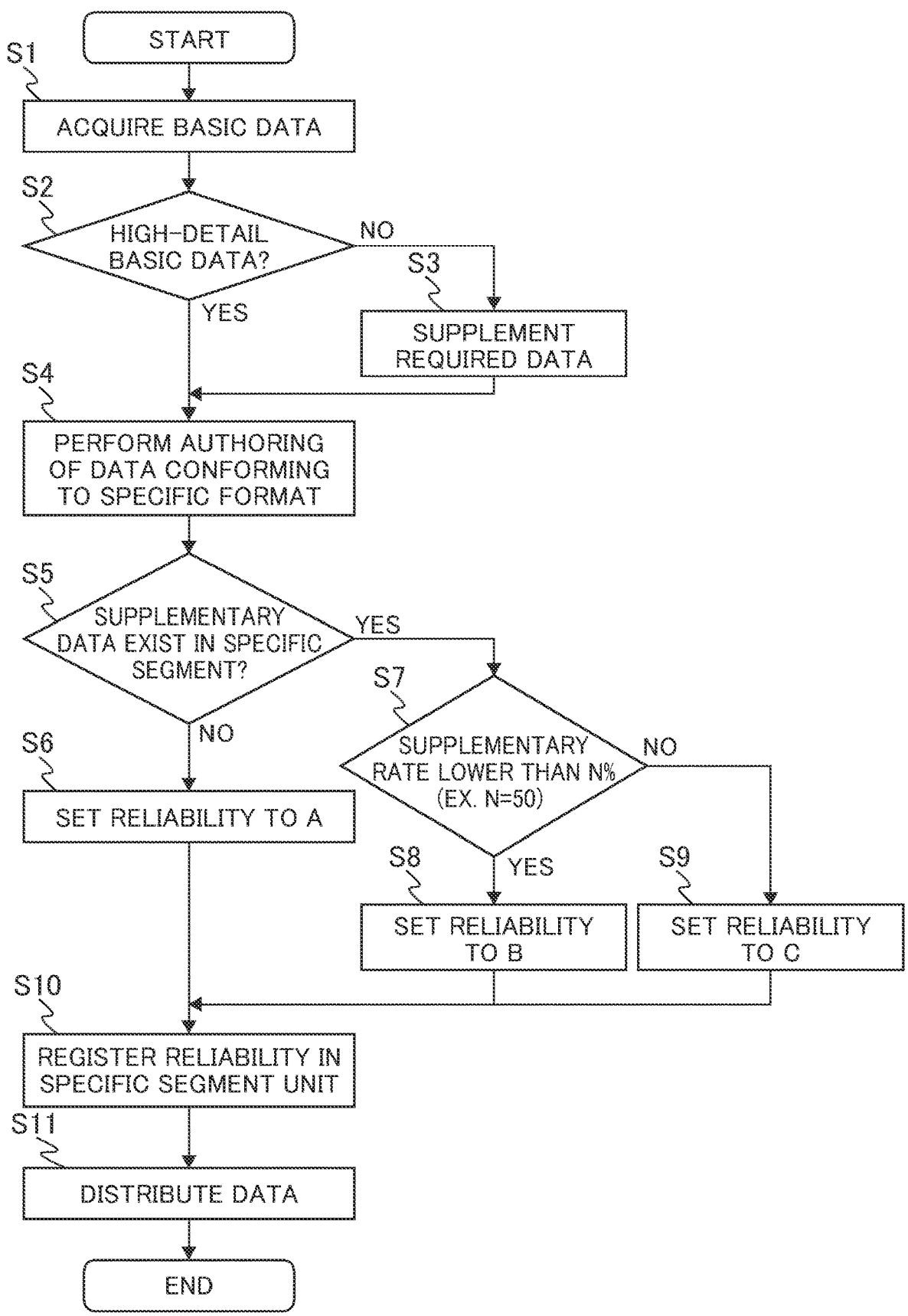
FIG. 4 is a flowchart representing a procedure executed by the present system as shown in FIG. 1 for highly detailing and distribution of the map data.

FIG. 4 is a flowchart representing a procedure executed by the present system as shown in FIG. 1 for highly detailing and distribution of the map data. An explanation of the process for highly detailing and distributing the map data will be made referring to FIGS. 1 and 4. In step S1, the map data generation unit 10 of the present server 4 takes various types of basic data in detail levels from high to low, that is, the high-detail basic data 1, the medium-detail basic data 2, and the low-detail basic data 3.

In step S2, the detail determination unit 11 of the map data generation unit 10 determines each detail level of the high-detail basic data 1, the medium-detail basic data 2, and the low-detail basic data 3, which have been taken in step S1. Each of the high-detail basic data 1, the medium-detail basic data 2, and the low-detail basic data 3, which have been taken into the map data generation unit 10 may be discriminated from one another for each of specific records of the respective data. In other words, determination of the detail level will be made differently depending on the specific records of the respective data rather than the whole set of data.

If the detail level of the thus taken basic data is not high (No in S2), the process proceeds to step S3 where the data supplementing unit 13 of the map data generation unit 10 brings topology information of the low-/medium-detail basic data 1, 2 which have been taken into the foregoing map data generation unit to a positive state, and executes data supplementation to provide the high-detail data in accordance with a specific logic (algorithm) for generating and adding geometry information.

Figure 5:
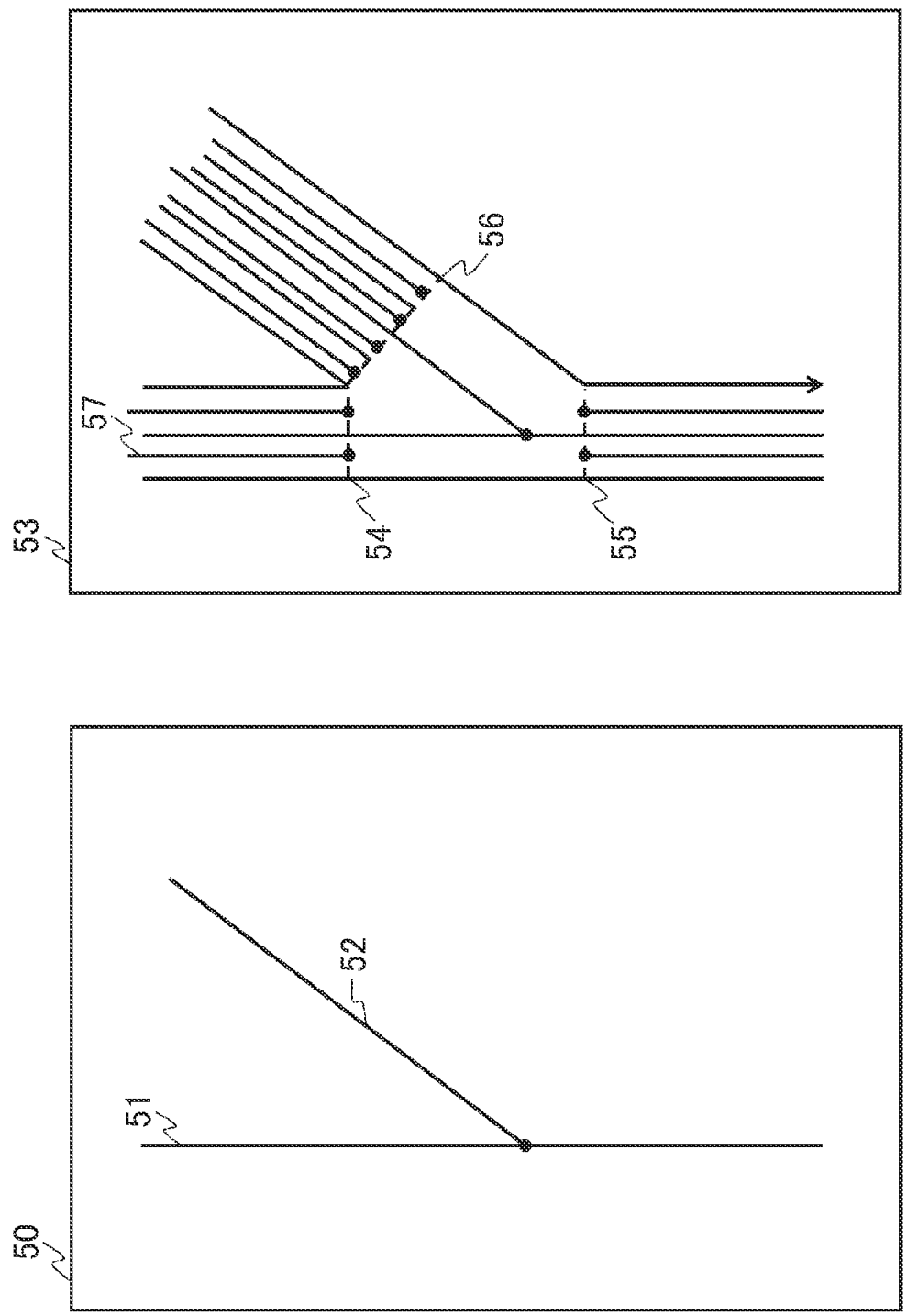
FIG. 5 illustrates an exemplified case of the process executed by the present system as shown in FIG. 1 for highly detailing the map data.

FIG. 5 illustrates an exemplified case of the process executed by the present system as shown in FIG. 1 for highly detailing the map data. As FIG. 5 illustrates, a road centerline information group (hereinafter referred to as "low-detail data") 50 is constituted by road centerlines 51, 52 in the form of the low-detail data. A lane centerline information group (hereinafter referred to as "high-detail data") 53 in the form of the high-detail data is obtained by supplementing insufficient information with respect to the road centerlines 51, 52. The road centerlines 51, 52 represent the topology information as the low-detail data. Meanwhile, the high-detail data 53 are obtained by generating and adding the low-detail data, and attribute information of the low-detail data, for example, position information on lane increasing/decreasing points 54, 56, 55, information on the number of lanes, information on the number of left/right lanes indicating increase in the number of lanes at left or right side, and the geometry information, for example, width information indicating the lane width so as to generate information on the lane centerline 57 and the like.

An arithmetic process is executed using the specific formula (algorithm) to generate the lane centerline 57 on a certain point. In other words, based on the topology information on the low-/medium-detail basic data 1, 2, the geometry information is generated and added suitably so that the high-detail data 53 are generated. The thus generated high-detail data 53 may be obtained through data supplementation using the highly accurate position information by possibly minimum amount based on the road video image and the three-dimensional point group data of the road peripheral environment, which have been acquired by MMS. The map data may be procured in the price lower than the price of the commercially procurable high-detail map for automatic driving operations from map data suppliers.

In step S2, if it is determined that the detail level of the basic data is high (Yes in S2), the process proceeds to step S4 where the authoring unit 12 of the map data generation unit 10 organizes high-detail data elements available for automatic driving operations, for example, the lane centerline 33 as shown in FIG. 3.

In other words, authoring is performed to the data conforming to the format which includes data format for specifying reliability in unit corresponding to the segment of the map data, which will be described later referring to FIG. 6, and allows the onboard machine 5 to reference elements of the respective high-detail data elements. In step S4, the authoring unit 12 of the map data generation unit 10 performs authoring of the data supplemented in step S3. As a result, the authoring unit 12 generates highly versatile map data, that is, the "versatile data".

In step S5, the reliability addition unit 17 contained in the reliability determination unit 14 of the map data generation unit 10 confirms presence/absence of supplementary data, and supplementary data rate N with respect to the map data which have undergone authoring performed by the authoring unit 12. The reliability addition unit 17 references a supplementary rate column 62 of the data format for specifying reliability in the unit indicating the segment of the map data to be described later referring to FIG. 6. The reliability addition unit 17 reads the presence/absence of supplementary data and the supplementary data rate in each segment unit, and transmits the read information to the reliability registration unit 15.

If no supplementary data exist in the map data in each segment unit thereof in step S5 (No in S5), the process proceeds to step S6 where the reliability addition unit 17 sets the reliability to A.

If the reliability addition unit 17 determines presence of the supplementary data in the segment unit in step S5 (Yes in S5), the process proceeds to step S7 where it is determined whether or not the supplementary data rate is lower than N % of all data in the segment. If the rate is lower than N % (Yes in S7), the process proceeds to step S8 where the reliability is set to B. If the rate is equal to or higher than N % (No in S7), the process proceeds to step S9 where the reliability is set to C.

In step S10, the reliability specified in each of the data segments is registered in the segment unit so that the reliability is associated with the corresponding data segment. In step S11, in response to the request of the onboard machine 5, the required map data including the reliability registered in the segment unit in step S10 are distributed.

FIG. 6 is a view of a reliability information table for each unit indicating the respective segments of the map data. FIG. 6 illustrates a map data reliability table 60 as an example of the format which allows management of reliability in each segment unit of the map data.

The map data reliability table 60 includes a data identification ID column 61, a supplementary rate column 62, a reliability column 63, a basic data generation date column 64, a reliability evaluation date column 65, and a reliability change information column 66. The data identification ID column 61 uniquely specifies the map data segment, and stores the data identification ID which can be associated with the respective reliability information.

The supplementary rate column 62 stores the presence/absence of supplementation, and the supplementary rate, which is referenced when determining the reliability column 63. The reliability column 63 stores the map data segment reliability. The basic data generation date column 64 stores the basic data generation date of the map data segment. The reliability evaluation date column 65 stores the reliability evaluation date of the map data segment.

The reliability change information column 66 stores reliability change information of the map data segment. The data identification ID column 61 and the reliability column 63 are used as information for the respective automobile manufactures to selectively use onboard sensors and data for automatic driving operations adapted to the automatic driving specification while referencing reliability of the respective data. Depending on the automatic driving specification, the map data with the reliability set to C or lower may be sufficiently used. This makes it possible to reduce the cost by avoiding such waste as excessive quality. Specifically, the automatic driving operation mode places higher importance on the use of sensors for determination based on the camera image than the use of the map.

The basic data generation date column 64, the reliability evaluation date column 65, and the reliability change information column 66 may be utilized as map data management information, and probability information on the determined reliability.

Figure 7:
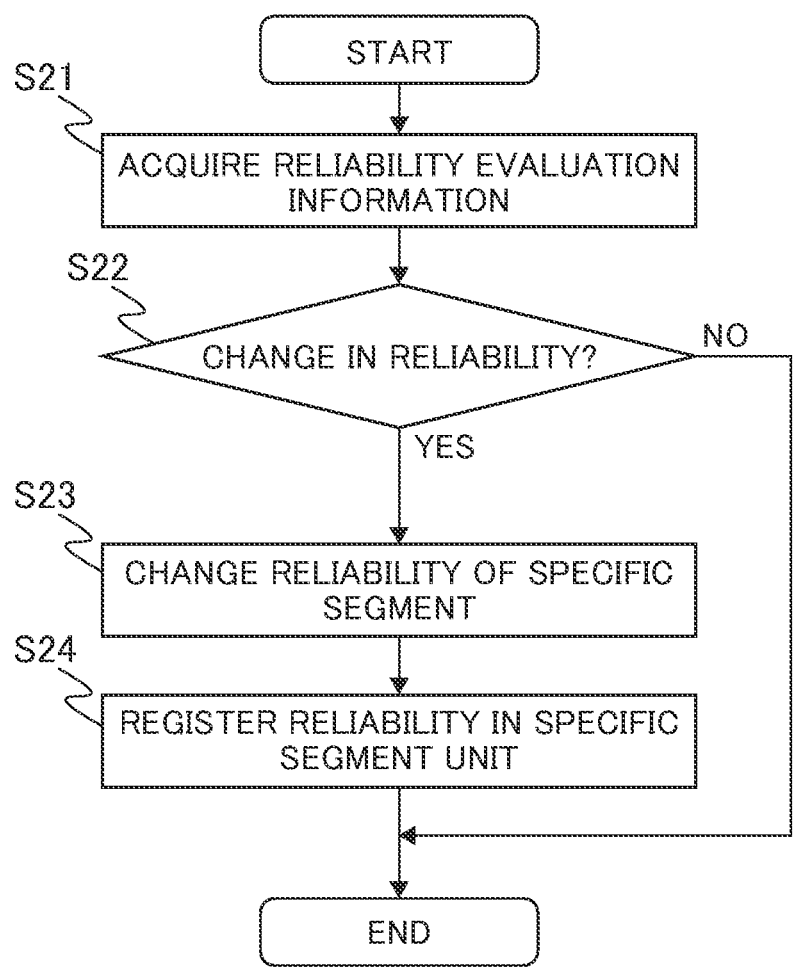
FIG. 7 is a flowchart representing a procedure executed by a reliability evaluation unit of an onboard machine for updating reliability of the map data.

FIG. 7 is a flowchart representing a procedure executed by the reliability evaluation unit of the onboard machine for updating the map data reliability. Referring to FIG. 7, in step S21, the reliability evaluation reception unit 9 of the present server 4 acquires reliability evaluation information (reliability evaluation information table to be described referring to FIG. 8) which allows reference of the reliability of each segment unit of map data evaluated by the reliability evaluation unit 7 of the onboard machine 5. In this case, an explanation of the reliability evaluation unit 7 of the onboard machine 5 will be omitted.

In step S22, the reliability evaluation confirmation unit 18 of the reliability determination unit 14 confirms change in the reliability of the information acquired in step S21 in each map data segment. If the change has occurred in the reliability (Yes in S22), the process proceeds to subsequent step. If no change has occurred (No in S22), the process ends.

In step S23, in accordance with change in the reliability confirmed in step S22, the reliability change unit 19 of the reliability determination unit 14 changes the reliability set in the column 63 indicated as the format example as shown in FIG. 6. In step S24, the reliability registration unit 15 of the map data generation unit 10 stores the reliability information which has been changed in step S23 in the database 16.

FIG. 8 represents an example of a reliability evaluation information table, or substantially an example of the format using information of four columns derived from the map data reliability table 60 as shown in FIG. 6. As FIG. 8 illustrates, a reliability evaluation information table 80 includes a data identification ID column 81, a reliability evaluation column 82, a reliability evaluation date column 83, and a reliability change information column 84.

Data stored in the data identification ID column 81 are permanentized to the same values as those of the data identification ID column 61. The ID allows the map data segment to be uniquely specified. The reliability evaluation column 82 represents the reliability which has been evaluated by the reliability evaluation unit 7 of the onboard machine 5.

The reliability evaluation date 83 represents the reliability evaluation date when the reliability evaluation unit 7 of the onboard machine 5 has evaluated the reliability. The reliability change information column 84 represents information of change which has occurred in the reliability evaluated by the reliability evaluation unit 7 of the onboard machine 5. It is possible to confirm change in the reliability by referencing the reliability change information column 84.

Figure 9:
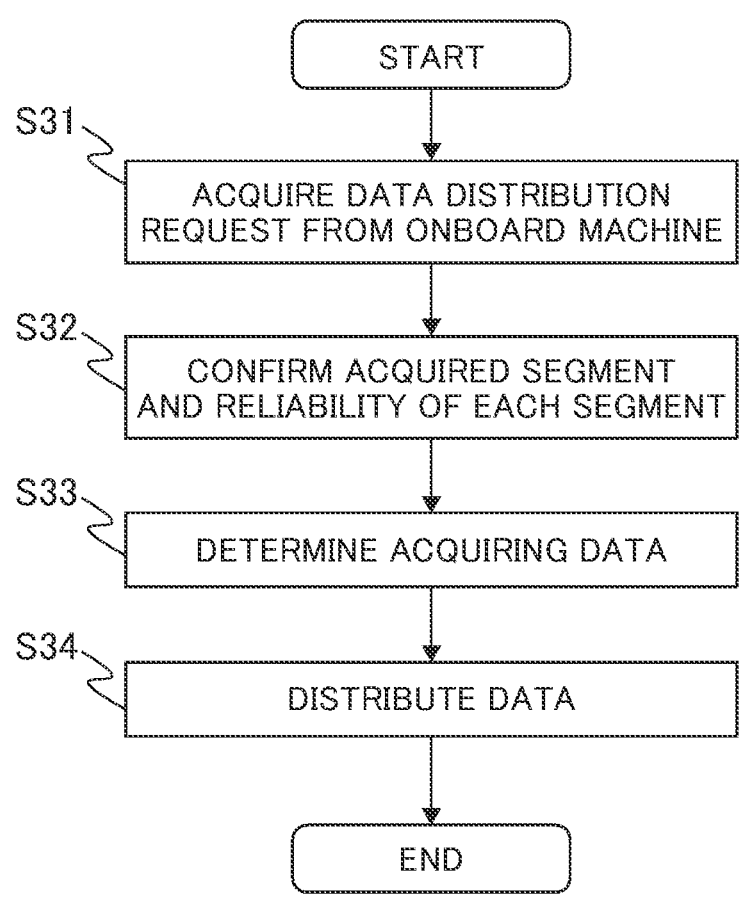
FIG. 9 is a flowchart representing a procedure to be executed in the case where the present system is employed for an automatic drive vehicle.

FIG. 9 is a flowchart representing a procedure to be executed in the case where the present system as shown in FIG. 1 is employed for the automatic drive vehicle. Referring to FIG. 9, in step S31, a distribution request is acquired from the onboard machine 5. In other words, the information acquired in step S31 indicates that the onboard machine 5 requires the data distribution unit 8 of the present server 4 to distribute the map data containing required map data segment and reliability of each segment.

In step S32, the data distribution unit 8 of the server 4 recognizes the request of distributing the map data containing the map data segments and the reliability of each segment, which have been acquired in step S31.

In step S33, the data distribution unit 8 determines the map data required for distribution, and constructs the determined map data in accordance with the content of the request of distributing the map data recognized in step S32. In step S34, the data distribution unit 8 distributes the map data constructed in step S33 to the onboard machine 5. The data transmission/reception unit 6 of the onboard machine 5 receives the map data.

Figure 10:
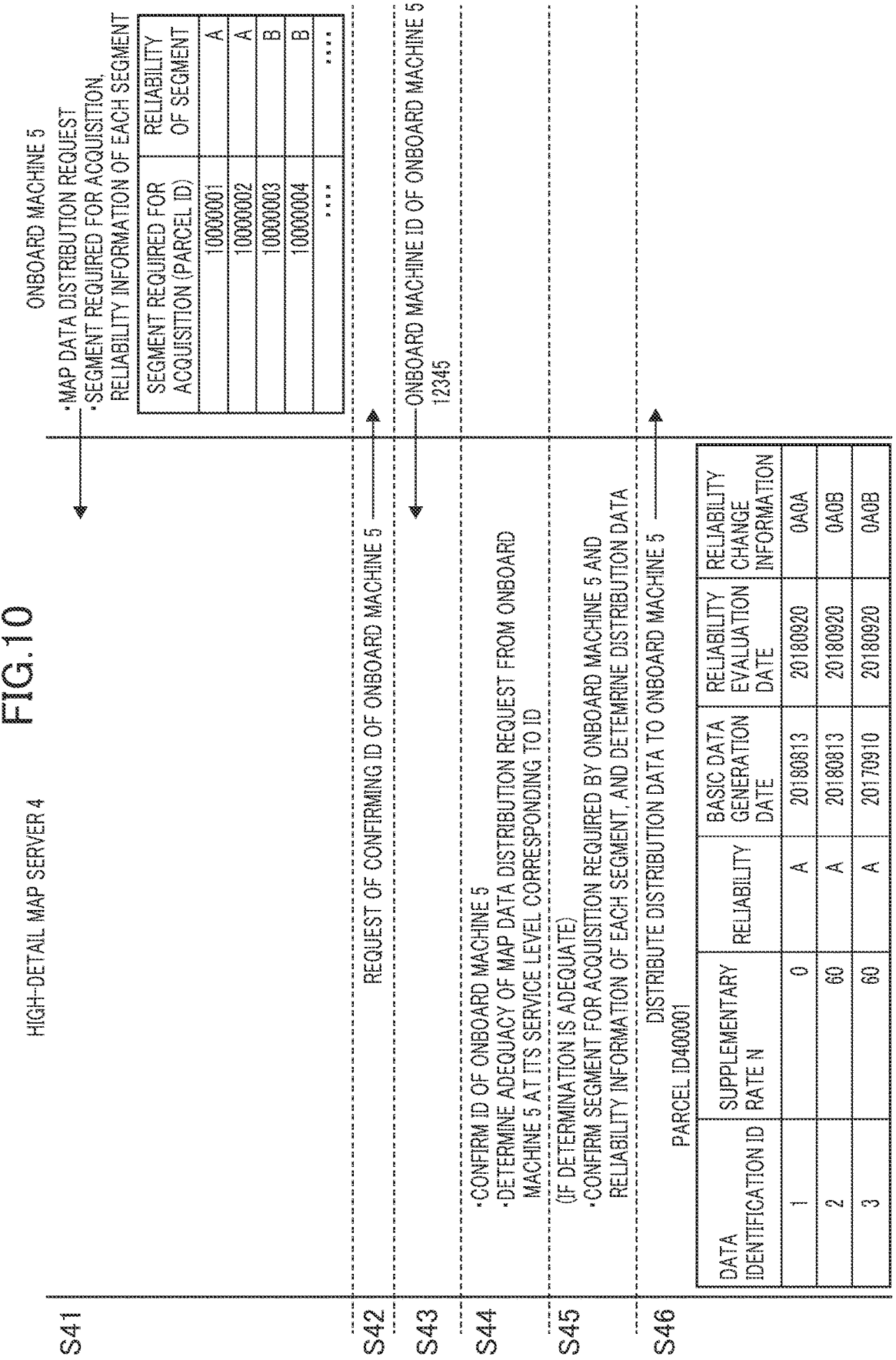
FIG. 10 is a sequence diagram representing an interface between a high-detail map data server (hereinafter referred to as a "present server") as shown in FIG. 1 and the onboard machine.

FIG. 10 is a sequence diagram representing an interface between the high-detail map data server (present server) 4 and the onboard machine 5 as shown in FIG. 1. Referring to FIG. 10, in step S41, the onboard machine 5 sends a map data distribution request together with the required segment and reliability information of each segment to the present server 4.

In step S42, upon reception of the map data distribution request from the onboard machine 5, the present server 4 sends a request to the onboard machine 5 for confirming its own ID. In step S43, the onboard machine 5 sends the ID to the present server 4.

In step S44, the present server 4 confirms the ID of the onboard machine 5, references the service level of the onboard machine 5, which has been preliminarily registered in the present server 4 in a unit of the onboard machine ID, and determines as to adequacy of the map data distribution request from the onboard machine 5.

If the determination made in step S44 is adequate, the present server 4 accepts the request in step S45. In other words, the present server 4 confirms the required segment and the reliability information of each segment, which have been sent as the map data distribution request from the onboard machine 5, and determines the data to be distributed to the onboard machine 5. In step S46, the present server 4 distributes the determined data to the onboard machine 5.

As described above, the present system is configured to have the present server 4 capable of accepting the map data distribution request, if any, from each of the onboard machines 5 with different automatic driving specifications. Instead of using the high-priced high-detail basic data 1, frequent use of the low-/medium-detail basic data 2, 3 which are procurable at low prices allows selection of data having the reliability registered for each segment, and distribution of the data with content with minimum possible quality responding to the request. The data responding to the request are made easily adaptable to the reliability and the data format set for the different specifications of distribution destinations. As a result, it is possible to reduce the cost for procuring the high-detail map data.

Summary of Embodiment

Summary of the embodiment will be described hereinafter.

[1] The present system is a computer system for correcting the data format and the detail level of the map data adaptively to the required specification of the distribution destination 5. The system includes the data supplementing unit 13, the authoring unit 12, and the database 16.

The data supplementing unit 13 supplements medium-/low-detail map data 2, 3 to make the map data highly detailed. The authoring unit 12 edits the map data adaptively to the multiple required specifications of the distribution destination 5, which differ at least in one of the data format and the detail level. The database 16 accumulates the map data edited by the authoring unit 12 to allow distribution of the map data as versatile data.

The present system allows the data format and the detail level of the input map data to be edited adaptively to the required specification which differs depending on the distribution destination device 5. For example, although the low-priced low-/medium-detail map data are used instead of the high-priced map data for automatic driving operations, those data may be supplemented for upgrading to the high-detail map data.

The high-detail map data which have been edited by the authoring unit 12 for enhancing versatility may be made easily adaptable to the reliability and the data format, which have been determined for each specification of different distribution destinations. As a result, it is possible to reduce the cost for procuring the high-detail map data.

[2] Preferably, the system further includes the reliability evaluation unit 7 and the reliability registration unit 15. The reliability evaluation unit 7 performs information communication with the distribution destination 5, and allows evaluation of the reliability indicating the degree to which the versatile data distributed from the database 16 are adapted to the required specification. The reliability registration unit 15 registers the reliability in the database 16 by associating the evaluation of the reliability evaluation unit 7 with the versatile data individually.

The reliability evaluation unit 7 evaluates reliability of versatile data distributed to the distribution destination 5 with respect to the required specification of the distribution destination 5. The evaluation of the reliability evaluation unit 7 is registered in the database 16 by the reliability registration unit 15 in association with the versatile data individually.

The data adapted to the required reliability for the specification determined by the distribution destination 5 are selected from the versatile data registered in association with the reliability, and the selected data are output. In this case, the distribution destination 5 is allowed to receive data before selection, and to select the data to be used by the distribution destination (onboard machine) 5. The versatile data accumulated in the database 16 allows improvement in the reliability registration every time when such data are used by the different distribution destinations while having versatility maintained.

[3] In the present system, preferably, the distribution destination 5 is in the form of the onboard machine 5 of the automatic drive vehicle. Preferably, the system further includes the reliability determination unit 14 between the reliability evaluation unit 7 and the reliability registration unit 15 to determine the reliability as the index indicating whether or not the versatile data are adapted to the automatic drive vehicle based on the result of comparison between the supplementary rate calculated as the degree of the need for the data supplementation and N % as a threshold value. If the reliability determination unit 14 determines that the reliability is highly accurate, the reliability registration unit 15 updates the registered content of the reliability in association with the versatile data.

The reliability determination unit 14 determines whether or not the versatile data is adapted to the multiple required specification specified for each of the onboard machines 5 of automatic drive vehicles, which differ at least in one of the data format and the detail level. If it is determined that the reliability is highly accurate, the reliability registration unit 15 updates the registered content of the reliability associated with the versatile data. It is possible to facilitate selective distribution of the high-detail map data with high reliability while accepting different requests from the automatic drive vehicle.

[4] The high-detail map data server (present server) 4 is the computer configured to correct the data format and the detail level of the input map data adaptively to the required specification of the distribution destination, and distribute the corrected data. The present server 4 includes the data supplementing unit 13, the authoring unit 12, the database 16, the data distribution unit 8, and the reliability reception unit 9.

The data distribution unit 8 distributes the data to the distribution destination 5. The distribution destination 5 evaluates reliability of the versatile data distributed from the database 16. The reliability reception unit 9 receives the evaluation from the distribution destination 5, and accumulates the versatile data in the database 16 while registering the reliability in association with the versatile data individually.

The authoring unit 12 edits data adaptively to the multiple required specifications of the distribution destination 5, which differ at least in one of the data format and the detail level. The accumulated versatile data may be selectively distributed as data which satisfy the reliability required for the distribution destination 5. As a result, the high-detail map data server 4 is capable of generating the high-detail map data.

The high-detail map server (present server) 4 of the embodiment executes the process for editing the low-priced low-/medium-detail basic map data 2, 3. This makes it possible to generate highly detailed and highly versatile map data and distribute the versatile data associated with the reliability information updated in each unit indicating the segment to, for example, the onboard machine 5 for automatic driving operations as the index clearly specifying the reliability of the map data.

In this case, the present server 4 allows the onboard machine 5 for automatic driving operations as the map data distribution destination to select the automatic driving operation data suitable for each automatic driving system developed by the respective automotive manufacturers in-house, and to utilize the data at lower costs. The present server 4 includes the reliability evaluation reception unit 9 which acquires feedback information as a result of using the low-/medium-detail map data having the highly detailing process unfinished, that is, the reliability evaluation information from the distribution destination 5.

If it is determined that the reliability evaluation information acquired by the reliability evaluation reception unit 9 as the feedback information from the distribution destination 5 is sufficiently highly accurate, the present server 4 updates registration of the reliability of the versatile data stored in the database 16. In this case, even if the low-/medium-detail basic data 2, 3 procurable at low prices are frequently used instead of the high-priced high-detail basic data 1, the present server 4 selectively distributes the data having the reliability registered in each segment.

[5] The method of highly detailing map data (present method) allows the computer to execute the program to distribute input map data having the data format and the detail level corrected adaptively to the required specification which differs for each device 5 of the distribution destination. The method includes data supplementing step S3, authoring step S4, reliability determination steps S5 to S9, and reliability registration step S10.

In data supplementing step S3, the data supplementing unit 13 supplements the medium-/low-detail map data 2, 3 to make the map data highly detailed. In authoring step S4, the authoring unit 12 edits the map data to enhance versatility. In reliability determination steps S5 to S9, reliability is determined in accordance with the supplementary rate contained in the supplementary data used for the data supplementation. In reliability registration step S10, the reliability is readably registered in the database 16 in association with the versatile data. This may provide advantageous effects substantially the same as those of the present invention as described in [2], [4].

According to the system for highly detailing map data (present system), the server for the system, and the method of highly detailing map data as described above, the use of the low-detail or medium-detail map data procurable at low prices are processed to be upgraded to the high-detail map data. Enhancing versatility of the highly detailed map data allows the data to be easily adaptable to the reliability and the data format, which have not been standardized conforming to different specifications. As a result, the cost for procuring the high-detail map data may be reduced.

The present invention which has been described as an example suitably applicable to the automatic driving operation is not restricted to the foregoing embodiment. It is also preferable to make the map of the generally employed car navigation system highly detailed in each segment. Any other embodiments may be regarded as being within a scope of the present invention without departing from its technical idea.

REFERENCE SIGNS LIST

1: high-detail basic data
2: medium-detail basic data
3: low-detail basic data
4: high-detail map server
5: onboard machine (distribution destination)
6: data transmission/reception unit
7: reliability evaluation unit
8: data distribution unit
10: map data generation unit
11: detail determination unit
12: authoring unit
13: data supplementing unit
14: reliability determination unit
15: reliability registration unit
16: database
17: reliability addition unit
18: reliability evaluation confirmation unit
19: reliability change unit
31: road centerline
32: centerlines of up/down lanes
33: lane centerline
34: road center data_data value for explaining low accuracy
35: true value for explaining low accuracy
36: road center data_data value_intersection position for explaining low accuracy
37: true value_intersection position for explaining low accuracy
38: road center data_data value for explaining high accuracy
39: true value for explaining high accuracy
40: road center data_data value_intersection position for explaining high accuracy
41: true value_intersection position for explaining high accuracy
50: road centerline information group (low-detail data)
51, 52: road centerline
53: lane centerline information group (high-detail data)
54, 56, 55: lane increasing/decreasing point
57: lane centerline
60: map data reliability table
61: data identification ID column
62: supplementary rate column
63: reliability column
64: basic data generation date column
65: reliability evaluation date column
66: reliability change information column
80: reliability evaluation information table
81: data identification ID column
82: reliability evaluation column
83: reliability evaluation date column
84: reliability change information column
N: threshold value of supplementary rate for determination of reliability

The invention claimed is:

1. A system for generating map data for correcting a data format and a detail level of the map data to a required specification of a distribution destination, comprising:
a processor operatively coupled to the system, the processor comprising:
a detail determination circuit for determining the detail level of the map data, the detail level comprising a first detail level and a second detail level;
a data supplementing circuit for supplementing first detail level map data to increase the detail level of the map data;
an authoring circuit for editing the map data to the required specification of the distribution destination, which differ at least in one of the data format and the detail level; and
a database for accumulating the map data edited by the authoring circuit to allow distribution of the map data as versatile data,
wherein the processor is configured to,
determine if supplementary data and a supplementary data rate are available on the map data that have undergone editing,
on a condition that the supplementary data and the supplementary data rate are not available on the map data that have undergone the editing, sets the reliability to a first predetermined reliability, and
on a condition that the supplementary data and the supplementary data rate are available on the map data that have undergone the editing, determines whether the supplementary data rate is lower than a threshold of all data within the map data,
on a condition that the supplementary data rate is lower, set the reliability to a second predetermined reliability, and
on a condition that the supplementary data rate is equal to or greater than the threshold of all data within the map data, set the reliability to a third predetermined reliability.

2. The system for generating map data according to claim 1, further comprising:
a reliability evaluation circuit for information communication with the distribution destination, and allowing evaluation of reliability indicating a degree to which the versatile data distributed from the database are adapted to the required specification; and a reliability registration circuit for registering the reliability in the database by associating the evaluation of the reliability evaluation circuit with the versatile data individually.

3. The system for generating map data according to claim 2, wherein:
the distribution destination is an onboard machine of an automatic drive vehicle;
a reliability determination circuit is further provided between the reliability evaluation circuit and the reliability registration circuit, the reliability determination circuit determining the reliability as an index indicating whether or not the versatile data are adapted to the automatic drive vehicle based on a result of comparison between the supplementary data rate calculated as a degree of a need for data supplementation and the threshold of all data within the map data; and
if the reliability determination circuit determines that the reliability is accurate, the reliability registration circuit updates a registered content of the reliability in association with the versatile data.

4. A map data server for distributing input map data having a data format and a detail level corrected to a required specification of a distribution destination, comprising:
a processor operatively coupled to the server, the processor comprising:
a data supplementing circuit for supplementing first detail level map data to increase the detail level of the map data;
an authoring circuit for editing the map data to the required specification of the distribution destination, which differ at least in one of the data format and the detail level;
a database for accumulating the map data edited by the authoring circuit to allow distribution of the map data as versatile data;
a data distribution circuit for distributing data to the distribution destination; and
a reliability reception circuit for registering the reliability in the database in association with the versatile data individually in response to reception of an evaluation from the distribution destination with respect to the versatile data distributed from the database,
wherein the processor is configured to,
determines if supplementary data and a supplementary data rate are available on the map data that have undergone editing,
on a condition that the supplementary data and the supplementary data rate are not available on the map data that have undergone the editing, sets the reliability to a first predetermined reliability, and
on a condition that the supplementary data and the supplementary data rate are available on the map data that have undergone the editing, determines whether the supplementary data rate is lower than a threshold of all data within the map data,
on a condition that the supplementary data rate is lower, set the reliability to a second predetermined reliability, and
on a condition that the supplementary data rate is equal to or greater than the threshold of all data within the map data, set the reliability to a third predetermined reliability.

5. A method of generating map data, allowing a computer to execute a program to distribute input map data having a data format and a detail level corrected to a required specification which differs for each device of a distribution destination, comprising:
a data supplementing step in which a data supplementing unit supplements first detail level map data to increase the detail level of the map data;
an authoring step in which an authoring unit performs an editing process to enhance versatility of the input map data;
a reliability determination step of determining reliability in accordance with a supplementary rate contained in supplementary data used for the data supplementation;
determining if the supplementary data and the supplementary rate are available on the map data that have undergone editing;
on a condition that the supplementary data and the supplementary rate are not available on the map data that have undergone the editing, setting the reliability to a first predetermined reliability, and
on a condition that the supplementary data and the supplementary rate are available on the map data that have undergone the editing, determining whether the supplementary data rate is lower than a threshold of all data within the map data,
on a condition that the supplementary rate is lower, setting the reliability to a second predetermined reliability, and
on a condition that the supplementary rate is equal to or greater than the threshold of all data within the map data, setting the reliability to a third predetermined reliability; and
a reliability registration step for readably registering the reliability in the database in association with the versatile data having the versatility enhanced.

* * * * *